United States Patent
Ko

(10) Patent No.: US 10,343,775 B2
(45) Date of Patent: Jul. 9, 2019

(54) METHOD OF USING UNMANNED AIRCRAFT VEHICLE (UAV) AS ELECTROMAGNETIC WAVE TRANSMISSION RELAY STATION TO REALIZE SELF-RECOVERY COMMUNICATION TRANSMISSION FUNCTIONS OF AEROSPACE VEHICLE

(71) Applicant: Jessika Li-Juan Ko, Taipei (TW)

(72) Inventor: Jessika Li-Juan Ko, Taipei (TW)

( * ) Notice: Subject to any disclaimer, the term of this patent is extended or adjusted under 35 U.S.C. 154(b) by 185 days.

(21) Appl. No.: 15/669,232

(22) Filed: Aug. 4, 2017

(65) Prior Publication Data
US 2018/0037320 A1 Feb. 8, 2018

(30) Foreign Application Priority Data

Aug. 4, 2016 (TW) .............................. 105124842 A
Jul. 14, 2017 (TW) .............................. 106123644 A

(51) Int. Cl.
| | | |
|---|---|---|
| *B64C 39/02* | (2006.01) | |
| *G05D 1/00* | (2006.01) | |
| *H04L 12/40* | (2006.01) | |

(52) U.S. Cl.
CPC ......... *B64C 39/024* (2013.01); *G05D 1/0022* (2013.01); *B64C 2201/122* (2013.01); *H04L 2012/4028* (2013.01)

(58) Field of Classification Search
CPC .................................................. B64C 39/024
See application file for complete search history.

(56) References Cited

U.S. PATENT DOCUMENTS

| | | |
|---|---|---|
| 6,176,451 B1 | 1/2001 | Drymon |
| 7,581,702 B2 | 9/2009 | Olson et al. |

(Continued)

FOREIGN PATENT DOCUMENTS

| | | |
|---|---|---|
| CN | 104967473 A | 10/2015 |
| CN | 105007115 A | 10/2015 |

(Continued)

OTHER PUBLICATIONS

Office Action issued by (TIPO) Intellectual Property Office, Ministry of Economic Affairs, R.O.C. dated Jul. 25, 2018 for Application No. 106123644, Taiwan.

(Continued)

*Primary Examiner* — Brandon M Renner
*Assistant Examiner* — Abdeltif Ajid
(74) *Attorney, Agent, or Firm* — Locke Lord LLP; Tim Tingkang Xia, Esq.

(57) ABSTRACT

A method of recovering communication transmission function of an aerospace vehicle. In operation, a remote control center receives, from a ground-based station, a request of recovering the communication transmission function of the aerospace vehicle being in operation and not on a ground. The request includes positioning information of the aerospace vehicle. In response to the request, the remote control center sends an instruction to an unmanned aircraft vehicle (UAV) in air. The UAV functions as an electromagnetic wave transmission relay station, and the instruction includes the positioning information of the aerospace vehicle. Thus, the UAV may track the aerospace vehicle according to the instruction, and establish a two-way communication between the remote control center and the aerospace vehicle via the UAV as the electromagnetic wave transmission relay station. Thus, the remote control center may perform recov- (Continued)

ery of the communication transmission function of the aerospace vehicle via the UAV.

14 Claims, 5 Drawing Sheets

(56) References Cited

U.S. PATENT DOCUMENTS

| | | |
|---|---|---|
| 9,313,167 B1 | 4/2016 | Easttom, II |
| 2003/0067541 A1 | 4/2003 | Joao |
| 2006/0145024 A1 | 7/2006 | Kosmas |
| 2011/0130636 A1 | 6/2011 | Daniel et al. |
| 2014/0316614 A1 | 10/2014 | Newman |
| 2015/0236778 A1 | 8/2015 | Jalali |
| 2016/0155097 A1 | 6/2016 | Venkatesha |
| 2017/0242431 A1* | 8/2017 | Dowlatkhah .......... G08C 17/02 |
| 2018/0026705 A1* | 1/2018 | Parks .................... B64C 39/024 701/2 |

FOREIGN PATENT DOCUMENTS

| | | |
|---|---|---|
| CN | 205039452 U | 2/2016 |
| CN | 205293076 U | 6/2016 |
| WO | 2015073687 A1 | 5/2015 |

OTHER PUBLICATIONS

Eric W. Frew, Timothy X. Brown, "Airborne Communication Networks for Small Unmanned Aircraft Systems", Proceedings of the IEEE, vol. 96, Issue 12, Dec. 2008, pp. 2008-2027.

Office Action issued by (TIPO) Intellectual Property Office, Ministry of Economic Affairs, R.O.C. dated Jun. 16, 2017 for Application No. 105124842, Taiwan.

Taiwan Patent Office, "Office Action", dated May 2, 2019, Taiwan.

* cited by examiner

METHOD OF USING UNMANNED AIRCRAFT VEHICLE (UAV) AS ELECTROMAGNETIC WAVE TRANSMISSION RELAY STATION TO REALIZE SELF-RECOVERY COMMUNICATION TRANSMISSION FUNCTIONS OF AEROSPACE VEHICLE

CROSS-REFERENCE TO RELATED PATENT APPLICATION

This application claims priority to and the benefit of, pursuant to 35 U.S.C. § 119(a), Taiwan Patent Application No. 105124842, filed Aug. 4, 2016, and Taiwan Patent Application No. 106123644, filed Jul. 14, 2017. The entire contents of the above identified applications are incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a method of using an unmanned aircraft vehicle (UAV) as an electromagnetic wave transmission relay station to realize a self-recovery communication transmission function of an aerospace vehicle, and more particularly to a method of using an UAV to function as a communication relay station to track manned and unmanned aircraft and satellites whose message reception and transmission is compromised by attenuation of electromagnetic wave transmission frequency signals while in operation.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

The Karman line, lying at an altitude of 100 km above the sea level of the Earth, commonly represents the perimeter between the Earth's atmosphere and outer space. Accordingly, the majority of academic views hold that the application for air law governing aircraft, flying against air on specific route, and for space law governing satellites, circulating in inertial circular motion, shall be distinguished by this measurement of 100 km altitude. In consequence, the area of an altitude of more than 100 km shall be deemed as space shared by the humankind, and shall be subject to the principles of space law. On the other hand, the altitude of less than 100 km taken from the sea level shall be subject to the rules of air law under national and international legal systems. Furthermore, under the air law, unmanned aircraft vehicles (UAVs) are not governed by national laws for its activities in: (1) the atmosphere of a maximum altitude of 100 km above the high seas; and (2) the space of a minimum altitude of 100 km above the sea level of the Earth.

Aircrafts usually effectuate communication by radio waves. By contrast, long-distance communication and transmission between a satellite and the ground is usually effectuated by microwaves. The main difference in frequency transmissions between radio waves and microwaves is that microwaves for use in a frequency transmission are directive and thus must be strictly fixed to a precise, position-corrected dish antenna to receive and transmit messages.

Electromagnetic waves include radio waves, microwaves, infrared, visible light, X-rays, and gamma-rays; et cetera, depending on their specific frequencies (or wavelengths). Radio waves, which have a frequency of 300 GHz or below and a wavelength of 1 mm or above, propagate through free space (including air and a vacuum). Microwaves have a frequency that ranges from 300 MHz to 300 GHz and a wavelength that ranges from 1 m to 1 mm. The microwaves have a higher frequency than that of the radio waves and are usually known as "super high frequency electromagnetic waves." Conventional artificial radio waves are widely applicable to wireless communication, broadcast, radar, communication satellites, navigation systems, and computer networks. However, conventional multi-path communication systems include satellite communication systems and operate at a microwave wavelength.

Electromagnetic waves, such as radio waves and microwaves, are susceptible to attenuation/fading—fluctuations of strength of the electrical field of a signal received, as a result of interference with the signal in the course of its transmission for natural reasons (such as rainfall) or artificial reasons (such as multi-path radio waves). In the situation where aircraft or satellites undergo frequency signal attenuation/fading and thus affect message reception and transmission, the aircraft or satellites can still fetch signals again before communicating with a ground-based control station to restore a communication transmission function, because all their apparatuses are built-in with electronic devices, such as a radio frequency computation system and wireless network, each of which has a self-recovery function. By contrast, the conventional method involves directly transmitting messages from the ground to aircrafts, UAVs or satellites presently operating in the air or in outer space, but the transmission process is again inevitably confronted with attenuation of radio frequency and microwave frequency in the course of long-distance transmission from the ground to an aerial vehicle to the detriment of the aircraft's recovery communication function. To eliminate the attenuation/fading of radio frequency and microwave frequency in the course of transmission across the atmosphere for natural reasons and artificial reasons and to get in line with the frequency attenuation arising from the Earth's rotation and revolution, the prior art discloses effectuating long-distance radio frequency transmission by enhanced frequency output power not only at the expense of technical requirements and cost control, but also at the risk of increased human exposure to radiation. In this regard, the conventional method to overcome the aforesaid known drawbacks is provided by commanding the aircraft, UAVs or satellites to go home for a ground repair, or delaying transmission, or discarding the UAVs or satellites, thereby incurring costs in operations and producing space junk.

Therefore, a heretofore unaddressed need exists in the art to address the aforementioned deficiencies and inadequacies.

SUMMARY

In view of the aforesaid drawbacks, aspects of the present invention provides a method of using an unmanned aircraft vehicle (UAV) as a communication controller node for tracking aerospace vehicles such as manned aircrafts, satellites or UAVs disadvantaged by transmission signal attenuation, and enabling a remotely-located remote pilot to realize a self-recovery communication transmission by intensifying electromagnetic wave transmission and initiating the loading of a transmission digital program to an electronic device installed on the manned aircraft or UAVs, thereby ensuring the aircraft can function well or restoring the capability of the UAVs to function as a communication relay station.

One aspect of the present invention is directed to a method of recovering communication transmission function of an aerospace vehicle In certain embodiments, the method includes: receiving, by a remote control center, a request of recovering the communication transmission function of the aerospace vehicle being in operation and not on a ground, wherein the request comprising positioning information of the aerospace vehicle; sending, by the remote control center, an instruction to an unmanned aircraft vehicle (UAV), wherein the UAV is in air, and is configured to function as an electromagnetic wave transmission relay station for recovering the communication transmission function of the aerospace vehicle, and wherein the instruction comprises the positioning information of the aerospace vehicle; tracking, by the UAV, the aerospace vehicle according to the instruction; and establishing a two-way communication between the remote control center and the aerospace vehicle via the UAV as the electromagnetic wave transmission relay station, and recovering the communication transmission function of the aerospace vehicle.

In certain embodiments, the remote control center is located on the ground.

In certain embodiments, the method further includes: receiving, by the remote control center, a task transfer signal from a ground-based station to complete a task transfer, wherein the task transfer signal indicates a regular communication with the aerospace vehicle.

In certain embodiments, the communication transmission function of the aerospace vehicle is recovered using the UAV as the electromagnetic wave transmission relay station by: receiving, by the UAV as the electromagnetic wave transmission relay station from the aerospace vehicle, information indicating frequency signal attenuation or fading occurred at the aerospace vehicle; sending, by the UAV as the electromagnetic wave transmission relay station, the information indicating frequency signal attenuation or fading occurred at the aerospace vehicle to the remote control center; examining and analyzing, at the remote control center, the frequency signal attenuation or fading occurred at the flying manned aircraft based on the information; sending, by the remote control center to the UAV, a signal for recovery of the communication transmission function of the aerospace vehicle; and sending, by the UAV, the signal to the aerospace vehicle to trigger a self-recovery process of the communication transmission function of the aerospace vehicle.

In certain embodiments, the aerospace vehicle is a flying manned aircraft.

In certain embodiments, the signal is sent by the UAV to the flying manned aircraft for intensifying electromagnetic waves.

In certain embodiments, the signal is sent by the UAV to the flying manned aircraft for restarting electronic equipment installed in the flying manned aircraft.

In certain embodiments, the aerospace vehicle is a satellite.

In certain embodiments, the signal is sent by the UAV to the satellite for intensifying electromagnetic waves.

In certain embodiments, the signal is sent by the UAV to the satellite for restarting electronic equipment installed in the satellite.

In certain embodiments, the signal is sent by the UAV to the satellite for launching a frequency to eliminate an interference in the satellite.

In certain embodiments, the signal is sent by the UAV to the satellite for transmitting a beam to re-adjust a frequency of the satellite.

In certain embodiments, the aerospace vehicle is a flying UAV different from the UAV as the electromagnetic wave transmission relay station.

In certain embodiments, the signal is sent by the UAV to the flying UAV for launching a frequency to eliminate an interference in the flying UAV.

In certain embodiments, the signal is sent by the UAV to the flying UAV for transmitting a beam to re-adjust a frequency of the flying UAV.

In view of the aforesaid drawbacks of the prior art, the present invention further provides a method for restoring communication transmission within an aerospace vehicle by a UAV, the method comprising the steps of: (1) creating a remote control mechanism comprising staff (human beings), artificial intelligence devices or robots, which is organized depending on the frequency attenuation/fading and the differences in communication transmission within an aerospace vehicle, and controlling a UAV operating in the air; (2) creating the UAV operating in the air and functioning as an electromagnetic wave transmission relay station, wherein the UAV is equipped with an electromagnetic wave communication device capable of frequency variation; (3) creating a mechanism whereby the remote control center, using the UAV, tracks an aerospace vehicle operating but having its message reception and transmission affected because of electromagnetic wave transmission frequency signal attenuation/fading; and (4) creating a mechanism whereby the UAV, controlled by the remote control center, functions as the electromagnetic wave transmission relay station and realizes a self-recovery communication transmission function by intensifying the electromagnetic waves or by initiating an electronic device installed in any aerial and space vehicle.

It is an objective of the present invention to provide a method whereby a UAV functions as an electromagnetic wave transmission relay station and realizes a self-recovery communication transmission function by intensifying the electromagnetic wave transmission or initiating the loading of a transmission digital program to an electronic device installed in any aircraft operating in the air, wherein, when the aerospace vehicle undergoes transmission frequency signal attenuation, the UAV functions as a wireless frequency transmission relay station, and a remote pilot remotely restores a communication transmission function of the aerospace vehicle through the UAV. The aerospace vehicle may be a manned aircraft.

Another objective of the present invention is to provide a method whereby a UAV functions as an electromagnetic wave transmission relay station and realizes a self-recovery communication function by intensifying electromagnetic wave transmission or initiating the loading of a transmission digital program to an electronic device installed in any space vehicle operating in the outer space, wherein, when the space vehicle undergoes transmission frequency signal attenuation/fading, the UAV functions as a wireless frequency transmission relay station, and a remote pilot remotely restores a communication transmission function of the space vehicle through the UAV. The space vehicle is a satellite.

Yet another objective of the present invention is to provide a method whereby a UAV functions as an electromagnetic wave transmission relay station and realizes a self-recovery communication function by intensifying electromagnetic wave transmission or initiating the loading of a transmission digital program to an electronic device installed in any aerospace vehicle operating in the air, wherein, when the aerospace vehicle undergoes transmission frequency signal attenuation, the UAV functions as a wireless frequency transmission relay station, and a remote pilot remotely restores a communication transmission function of the aerospace vehicle through the UAV. The aerospace vehicle may be a UAV.

Still yet another objective of the present invention is to provide a method whereby a UAV functions as an electromagnetic wave transmission relay station and realizes a self-recovery communication function by intensifying electromagnetic wave transmission or initiating the loading of a transmission digital program to an electronic device installed in any aerospace vehicle, wherein, the UAV relates to the aerospace vehicle in a manner, including one-to-one, one-to-many, many-to-one, and many-to-many.

A further objective of the present invention is to provide a method for restoring communication transmission within an aircraft by a UAV, the method comprising the steps of: (1) creating a remote control mechanism comprising staff (human beings), artificial intelligence devices or robots, which is organized depending on the frequency attenuation/fading and the differences in communication transmission within an aerospace vehicle, and controlling a UAV operating in the air; (2) creating the UAV operating in the air and functioning as an electromagnetic wave transmission relay station, wherein the UAV is equipped with an electromagnetic wave communication device capable of frequency variation; (3) creating a mechanism whereby the remote control center, using the UAV, tracks an aerospace vehicle operating but having its message reception and transmission affected because of electromagnetic wave transmission frequency signal attenuation/fading; and (4) creating a mechanism whereby the UAV, controlled by the remote control center, functions as the electromagnetic wave transmission relay station and realizes a self-recovery communication transmission function by intensifying the electromagnetic waves or by initiating an electronic device installed in any aerial and space vehicle.

These and other features, aspects, and advantages of the present invention become more comprehensible with reference to the following description and the appended claims. It should be understood that the foregoing general description and the following specific description are merely exemplary and explanatory, and are intended to provide required further description of the present invention.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
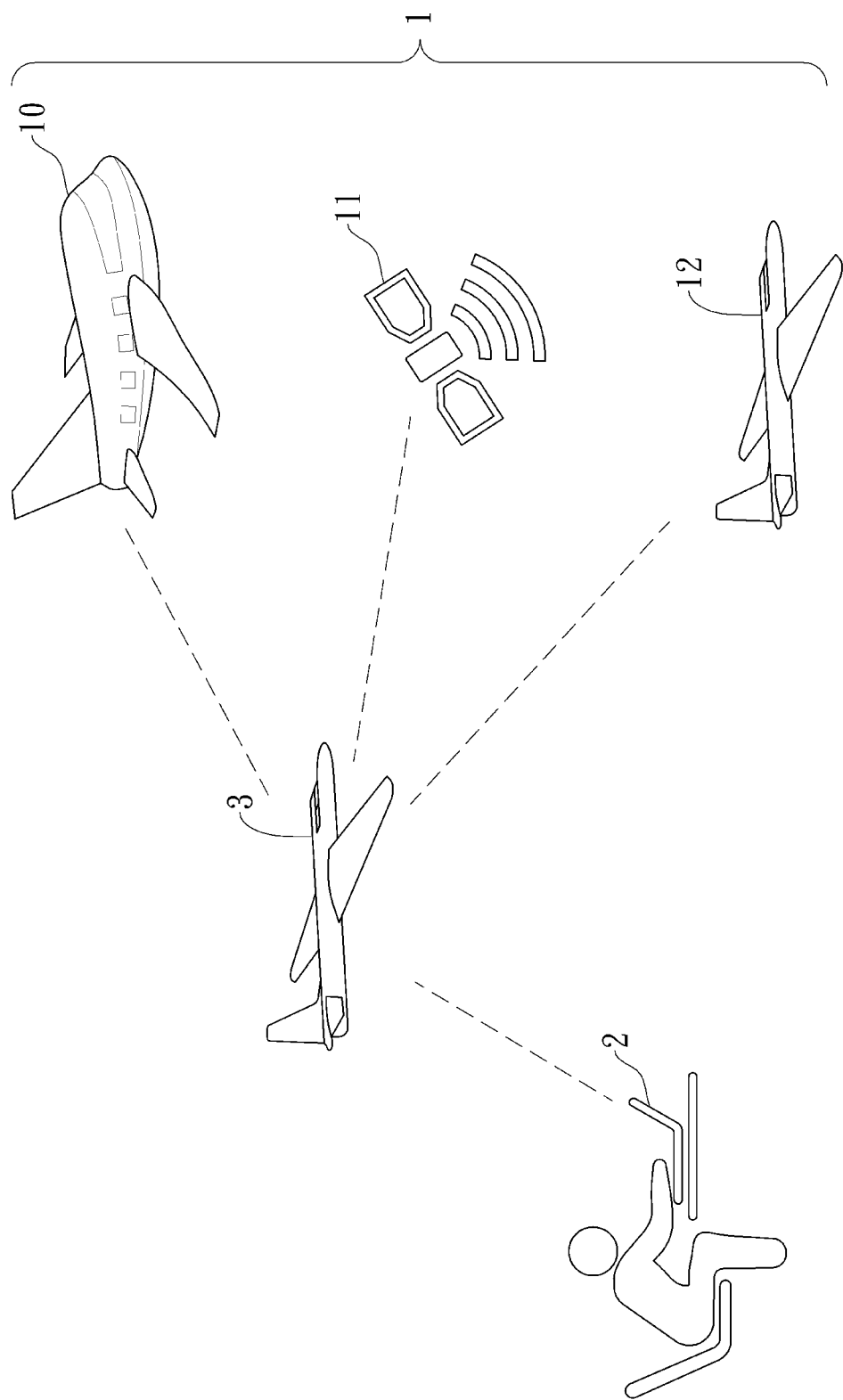
FIG. 1 is a schematic view of a system performing a method according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, the term "and/or" includes any and all combinations of one or more of the associated listed items.

As used herein, the terms "comprising", "including", "carrying", "having", "containing", "involving", and the like are to be understood to be open-ended, i.e., to mean including but not limited to.

As used herein, the term "unmanned aircraft vehicle" or its abbreviation "UAV" refers to a pilotless aircraft, in the sense of Article 8 of the Convention on International Civil Aviation, which is flown without a pilot-in-command on-board and is either remotely and fully controlled from another place (ground, another aircraft, space) or programmed and fully autonomous. Further details of the definition of the UAV may be referenced in the "ICAO Global ATM operational concept (Doc 9854)".

As used herein, the term "aerospace vehicle" refers to an aerial vehicle (e.g., an aircraft or a UAV) which is capable of flying in the air, or a space vehicle (such as a satellite) which is capable of moving or operating in space.

FIG. 1 is a schematic view of a system performing a method according to certain embodiments of the present invention. Referring to FIG. 1, the system includes a plurality of aerospace vehicles 1. In certain embodiments, each aerospace vehicle 1 may be a manned aircraft 10, a satellite 11, and/or an UAV 12. In certain embodiments, each aerospace vehicle 1 (the manned aircraft 10, the satellite 11, and/or the UAV 12) is in operation, and is thus not on the ground. Each aerospace vehicle 1 starts its functions of wireless communication and keeps connection with a ground-based control station (not shown in FIG. 1).

In certain embodiments, the manned aircraft 10 may be a civil aircraft. In certain embodiments, the satellite 11 is an artificial aircraft, such as a communication-oriented satellite, i.e., communication satellite, which functions as a radio frequency communication relay station for receiving signals from the ground and then transmitting the signals to a signal-receiving end. With communication satellites operating at an altitude high enough to attain wide radio frequency coverage, just three communication satellites located in a geo-stationary orbit and spaced apart equidistantly can enable communication globally except for the Arctic and the Antarctic zones. In certain embodiments, the UAV 12, which is either provided in a singular number or provided in a plural number and connected in series, functions as a radio frequency communication relay station that substitutes for the satellite.

Further referring to FIG. 1, the system includes a remote control center (also known as a remote control mechanism) 2 and an UAV 3. The UAV 3 is provided to function as an electromagnetic wave transmission relay station between the remote control center 2 and one or more of the aerospace vehicles 1. It should be particularly noted that the UAV 3 (which functions as the electromagnetic wave transmission relay station) and the UAV 12 (which functions as an aerospace vehicle 1) are different. The remote control center 2 is configured to control the UAV 3 (as the electromagnetic wave transmission relay station). In certain embodiments, the remote control center 2 may be located on the ground. Alternatively, in certain embodiments, the remote control center 2 may be located in the air (e.g., in an aircraft) or in space (e.g., in a space station). In certain embodiments, the remote control center 2 may be formed by a combination of staff (human beings), artificial intelligence devices or robots. Such a remote control center 2 is organized to overcome the frequency attenuation/fading, interference conditions and the differences in communication transmission within an aerospace vehicle 1.

In certain embodiments, the remote control center 2 operates the UAV 3 by combining circuits, electromagnetic waves and/or man-made operation depending on the frequency attenuation/fading, interference conditions and the differences in communication transmission within an aerospace vehicle. The UAV 3, which functions as an electromagnetic wave transmission relay station, has a constituent medium of a receiver (not shown) and a transmitter (not shown). The UAV 3 is equipped with one or more electromagnetic wave communication device capable of frequency variation (not illustrated) to regulate and transmit a message in response to frequency attenuation which happens to the message received and transmitted within an electromagnetic wave spectrum, thereby contributing to an increase in a communication distance or intensifying or expanding frequency coverage.

Figure 2:
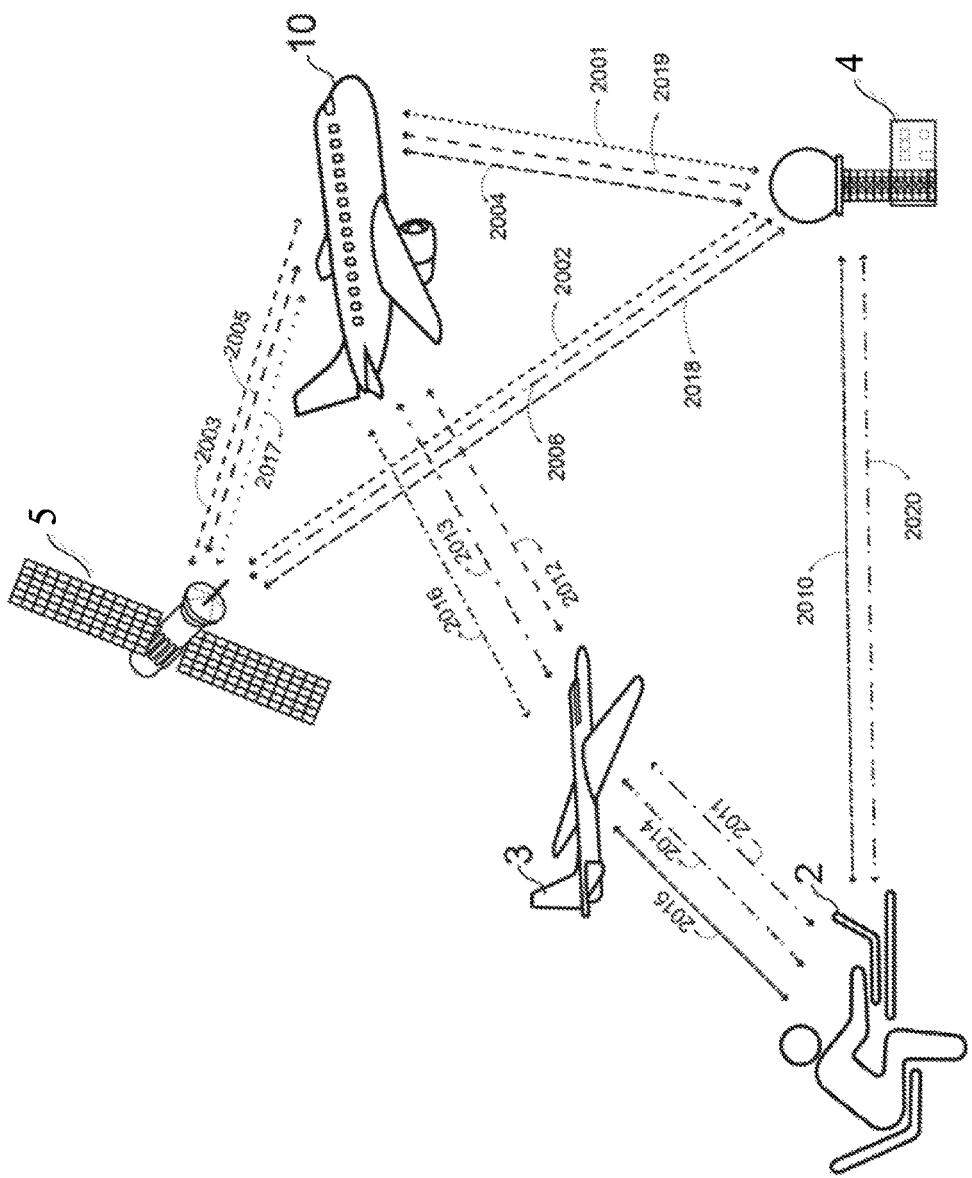
FIG. 2 is a schematic view of a system performing the method to troubleshoot communication transmission frequency signal attenuation/fading of a manned aircraft according to an embodiment of the present invention.

FIG. 2 is a schematic view of the method being performed to troubleshoot communication transmission frequency signal attenuation/fading of a manned aircraft according to an embodiment of the present invention. As shown in FIG. 2, the aerospace vehicle in this embodiment is a manned aircraft 10. In certain embodiments, the method as shown in FIG. 2 may be implemented by a system as shown in FIG. 1. It should be particularly noted that, unless otherwise stated in the present disclosure, the steps of the method may be arranged in a different sequential order, and are thus not limited to the sequential order as shown in FIG. 2 and described in the corresponding disclosure as below.

Referring to FIG. 2, under normal circumstances, the digital chain in the electronic system installed in the aircraft 10 will mutually transmit and report the aircraft communication addressing and reporting system (positioning information) to a ground-based station 4. In certain embodiments, the aircraft 10 will mutually transmit the digital messages (communication frequency information) to the ground-base station 4 by using the VHF radio transmission (step 2001). Alternatively, the ground-based station 4 will mutually transmit the positioning information of the aircraft 10 delivered by the airlines together with the communication frequency information with a telecommunication satellite 5 (step 2002). After the telecommunication satellite 5 will track and communicate with the aircraft 10 (step 2003), the aircraft 10 will transfer the telecommunication information to the ground-based station 4 (step 2004). Meanwhile, the aircraft 10 may also transmit the positioning information and the telecommunication information to the telecommunication satellite 5 (step 2005), and then the telecommunication satellite 5 will transmit the same information to the ground-based station (step 2006) to jointly structure the communication network among the aircraft 10, the ground-based station 4 and the telecommunication satellite 5. In this case, as long as the communication network is fully functioning, there is no need to perform any recovery process to the aircraft 10.

In terms of the frequency signal attenuation/fading caused to the aircraft 10, the bigger frequency interference to the manned aircraft 10 includes spurious radiation interference, (receiver and transmitter) intermodulation interference and electromagnetic environment background noise increase interference, etc. The mentioned interference led to the transmission frequency signal attenuation/fading, so that the person or equipment inside the aircraft 10 has difficulty to carry on clear and continuous communication with the ground-based station 4. In certain embodiments, when the ground-based station 4 fails to keep immediate and clear communication with the manned aircraft 10, the ground-based station 4 will send a request to the remote control center 2 in order to perform a recovering process of the communication transmission function of the aircraft 10 (step 2010). In certain embodiments, the method that the ground-based station 4 sends the request to the remote control center 2 may be implemented by transmitting an electromagnetic wave with the positioning information, such as information under the Aircraft Communication Addressing and Reporting System (ACARS) and the telecommunication information of the aircraft 10. In other words, the request includes the positioning information and telecommunication information of the aircraft 10. In certain embodiments, the telecommunication information may include information under the VHF(AM) frequency system installed on the aircraft 10. In certain embodiments, in addition to the VHF(AM) frequency system for communication, the aircraft 10 may also be equipped with a HF frequency system for long distance communication, and the telecommunication information may include information under the HF frequency system. Taking EVA Airways as an example, an aircraft 10 under the flight no. BR36 may use 8903 KHz to transmit the telecommunication information. In this case, the telecommunication information of the aircraft 10 may include the information about the frequency (i.e., 8903 KHz) being used by the aircraft 10.

Once the remote control center 2 receives the request from the ground-based station 4, the remote control center 2 will contact the UAV 3 (i.e., the electromagnetic wave transmission relay station) by transmitting an instruction to the UAV 3 (step 2011). In certain embodiments, the instruction is generated based on the same frequency of the positioning information of the aircraft 10, such that the UAV 3 may use the positioning information to track the aircraft 10. Once the UAV 3 receives the instruction from the remote control center 2, the UAV 3 will track and find the aircraft 10 (step 2012). After the UAV 3 tracks and finds the aircraft 10, the UAV 3 will receive information related to frequency signal attenuation/fading occurred at the aircraft 10 (step 2013). Then, the UAV 3 may transmit such information to the remote control center 2 (step 2014). Afterward, the remote control center 2 should examine and analyze, based on the information transmitted by the UAV3, the transmission barriers occurred at the aircraft 10. Then, the remote control center 2 may organize staff (human beings), artificial intelligence devices or robots to operate and control the UAV 3. Specifically, the UAV 3 is equipped with one or more electromagnetic wave communication devices capable of frequency variation, and the remote control center 2 may control the UAV 3 to perform the functions of electromagnetic wave emission using the electromagnetic wave communication devices (step 2015). In this case, a two-way transmission may be carried out by the UAV 3 to transmit the frequency corresponding to the telecommunication frequency to perform a recovering process to the communication transmission function on the aircraft 10, such as intensifying the radio wave or restarting the electronic equipment installed in the aircraft 10 (step 2016). In certain embodiments, the aircraft 10 is equipped with a frequency receiver, which will forward the arrived signals from the UAV 3 to the communication management unit (CMU) via the built-in modem. The CMU verifies the aircraft positioning information with the registered number to ensure the signals sent from the UAV 3 is indeed for the aircraft 10. If verification is successful, the CMU continues to process the frequency signals to perform the recovering process. In certain embodiments, once the aircraft 10 resumes the function by self-recovering and re-establishes the communications, the same aircraft 10 will transmit the positioning and telecommunication information to the telecommunication satellite 5 (step 2017). The telecommunication satellite 5 and the ground-based station 4 will trigger two-way communication (step 2018). Meanwhile, the ground-based station 4 will assure restoring the normal communication network with the aircraft 10 (step 2019). Afterward, the remote control center 2 and the ground-based station 4 should complete the task transfer, so that the aircraft communication network is back to normal operation (step 2020). In certain embodiments, the remote control center 2 receives a task transfer signal from the ground-based station 4 to complete the task transfer, and the task transfer signal indicates a regular communication with the aircraft 10.

In certain embodiments, it is possible that more than one aircraft 10 suffers the frequency signal attenuation/fading at about the same time. In this case, different ground-based stations 4 are able to transmit the various positioning information and telecommunication information of each aircraft 10 to the remote control center 2 independently, and the remote control center 2 may perform the process to recover each aircraft 10 separately. For instance, two aircrafts A and B simultaneously encounter communication barriers which cannot be overcome by each of the aircrafts and the ground-based station(s) 4. In this case, the ACARS installed in aircrafts A and B will respectively send the message to restore communication to corresponding ground-based stations C and D. The ground-based stations C and D will be able to respectively transmit the ACARS mark of each aircraft and the routing tables for each telecommunication information which have been previously provided by airlines to the data link service provider (DSP) host system to distinguish the positioning information of Aircraft A and B (ACARS mark) and the telecommunication frequency information (communication message routing table) to the remote control center 2. The remote control center 2 is capable of selecting and controlling one or more UAVs 3 as well as one or more electromagnetic wave communication devices capable of frequency variation to track Aircraft A and B separately. After the UAV 3 (or multiple UAVs 3) tracks and finds the aircrafts A and B, the remote control center 2 should be able to individually examine and analyze the telecommunication barriers for each aircraft. Then, the remote control center 2 may control the UAV 3 (or multiple UAVs 3) to launch two-way transmission frequency to each of the aircraft A and B by transmitting the frequency corresponding to the telecommunication frequency in order to intensify the radio wave or to restart the electronic equipment installed in the aircrafts A and B, respectively. The same process continues until aircrafts A and B resume the function of self-recovery and re-establish the communications. Afterward, the remote control center 2 and the ground-based stations C and D should complete the task transfer, so that the communication network of the aircrafts A and B is back to normal operation.

Figure 3:
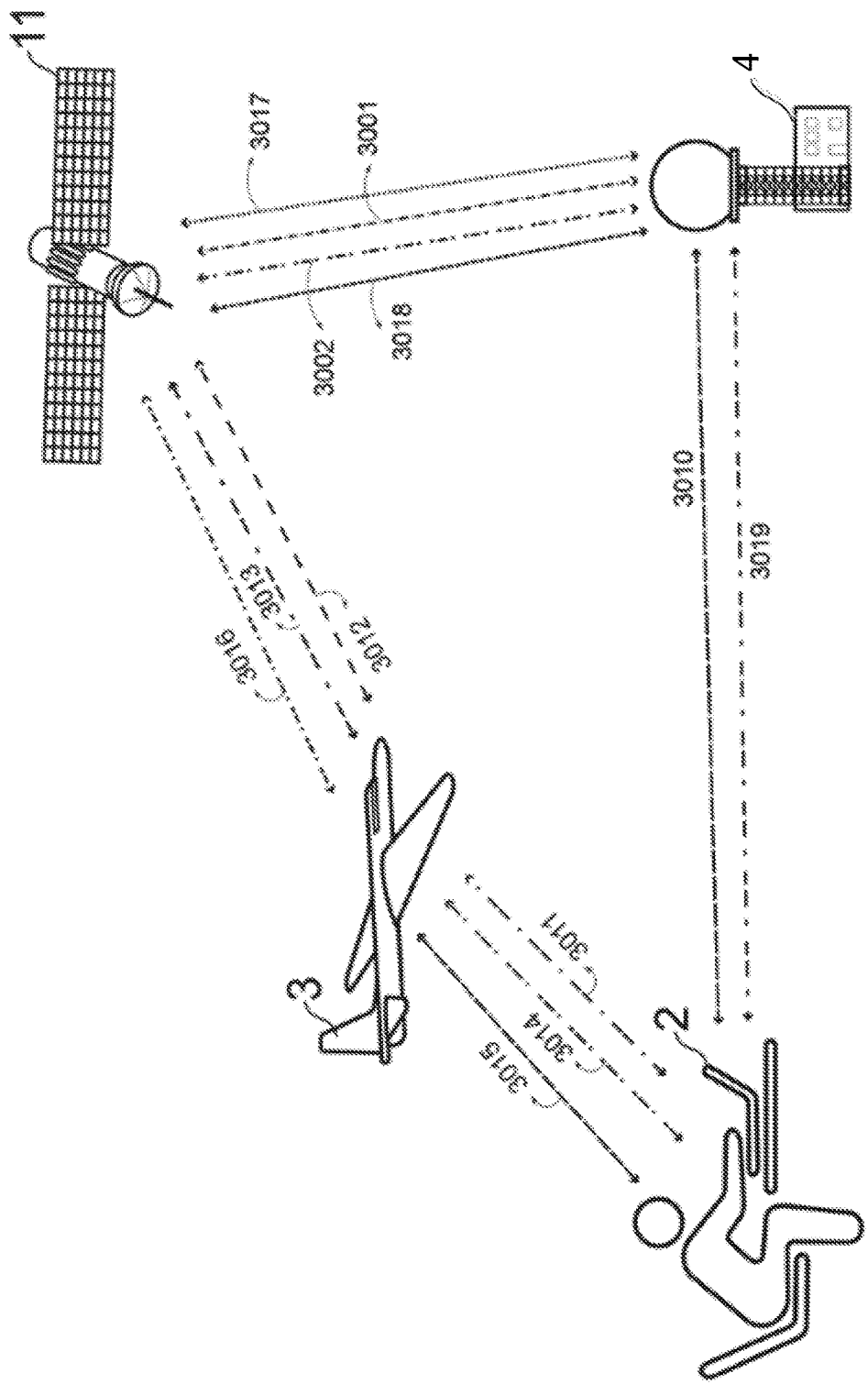
FIG. 3 is a schematic view of a system performing the method to troubleshoot communication transmission frequency signal attenuation of a satellite according to an embodiment of the present invention.

FIG. 3 is a schematic view of a system performing the method to troubleshoot communication transmission frequency signal attenuation of a satellite according to an embodiment of the present invention. As shown in FIG. 3, the aerospace vehicle in this embodiment is a satellite 11. In certain embodiments, the method as shown in FIG. 3 may be implemented by a system as shown in FIG. 1. It should be particularly noted that, unless otherwise stated in the present disclosure, the steps of the method may be arranged in a different sequential order, and are thus not limited to the sequential order as shown in FIG. 3 and described in the corresponding disclosure as below.

Referring to FIG. 3, radio communications are performed using electromagnetic waves to transmit signals. Since these electromagnetic waves are linearly propagated, they may be blocked due to the Earth's curved surface. Currently, a satellite 11 uses wide band radio and microwave to transmit messages to the ground-based station 4 in order to pass the message among the surface of the Earth. To prevent from interference of signal transmission, the International Telecommunication Union encoded regulatory rules to allocate frequency ranges or bands that can be used by each organization to reduce the risk of interference of signal transmission. When the satellite 11 is invaded by unknown interference, the satellite and its interference source may be located through the double satellite positioning technology, multi-beam antenna (Multi-beam Antenna, MBA) positioning technology and other ways from the ground in order to eliminate the interference and to recover the communication. In the case of the normal operation of the satellite 11, the specific frequency is transmitted from the ground-based station 4 to the satellite 11 (step 3001). The satellite 11 transmits the collected electromagnetic wave information to the ground-based station 4 (step 3002), which together constitutes the communication network between the satellite 11 and the ground-based station 4. In this case, as long as the communication network is fully functioning, there is no need to perform any recovery process to the satellite 11.

In terms of frequency signal attenuation/fading for the satellite 11, it happens when the application of satellites in the synchronous orbit increases rapidly, and the mutual interference between the main lobe and the side lobe of the antenna radiation field between the satellite 11 and the ground-based station 4 is becoming more and more serious. In addition, it also happens when radio communication is rapidly expanding, many frequencies originally used for satellite communications (e.g., four bands, L, C, Ku, and Ka) are also used by terrestrial microwave relay services (e.g., C-band—6 GHz range up link and 4 GHz range down link). Hence, when the satellite 11 and the ground-based station 4 do not properly locate the addressing frequency, the communication will be interfered by the ground microwave. In this case, the ground-based station 4 will send a request to the remote control center 2 in order to perform a recovering process of the communication transmission function of the satellite 11 (step 3010) when the frequency interference intensifies to cause frequency signal attenuation/fading and results in unclear and discontinuous communication transmission between the satellite 11 and the ground-based station 4. In certain embodiments, the request includes the positioning information on the disturbed satellite 11 and related information of the satellite 11.

Once the remote control center 2 receives the request from the ground-based station 4, the remote control center 2 will contact the UAV 3 (which functions as an electromagnetic wave transmission relay station) by transmitting an instruction to the UAV 3 (step 3011). In certain embodiments, the instruction is in the form of an electromagnetic wave of the same frequency of positioning the satellite 11, and includes the positioning information of the satellite 11, such that the UAV 3 may use the positioning information to track the satellite 11. Once the UAV 3 receives the instruction from the remote control center 2, the UAV 3 will track and find the satellite 11 (step 3012). After the UAV 3 tracks and finds the satellite 11, the UAV 3 will receive the information related to frequency signal attenuation/fading occurred at the satellite 11 (step 3013). Then the UAV 3 will transmit such information to the remote control center 2 (step 3014). Afterward, the remote control center 2 should examine and analyze, based on the information transmitted by the UAV 3, the transmission barriers occurred at the satellite 11. Then, the remote control center 2 may organize staff (human beings), artificial intelligence devices or robots to operate and control the UAV 3. Specifically, the UAV 3 is equipped with one or more electromagnetic wave communication devices capable of frequency variation, and the remote control center 2 may control the UAV 3 to perform the functions of electromagnetic wave emission using the electromagnetic wave communication devices (step 3015). In this case, a two-way transmission may be carried out by the UAV 3 to transmit the frequency corresponding to the telecommunication frequency to perform a recovering process to the communication transmission function on the satellite 11, such as intensifying the radio wave, restarting the electronic equipment installed in the satellite 11, launching a frequency to eliminate the interference, or transmitting a beam to re-adjust the frequency of the satellite 11 in order to restore the telecommunication functions for the satellite 11 (step 3016). Once the recovery process is performed, the satellite 11 may directly connect to the ground-based station 4 (step 3017), and the ground-based station 4 will confirm the restoring communication with the satellite 11 (step 3018). Afterward, the remote control center 2 and the ground-based station 4 should complete the task transfer (step 3019), so that the satellite 11 communication network is back to normal operation.

In certain embodiments, it is possible that more than one satellite 11 suffers the frequency signal attenuation/fading at about the same time. In this case, different ground-based stations 4 are able to transmit the various positioning and interference information of each satellite 11 to the remote control center 2 independently, and the remote control center 2 may perform the process to recover each satellite 11 separately. The remote control center 2 is able to distinguish the frequency signal attenuation/fading in different satellites 11, and is capable of selecting and controlling one or more UAVs 3 as well as one or more electromagnetic wave communication devices capable of frequency variation to track different satellites 11 separately. After the UAV 3 (or multiple UAVs 3) tracks and finds the satellites 11, the remote control center 2 should be able to individually examine and analyze the telecommunication barriers for each satellite. Then, the remote control center 2 may control the UAV 3 (or multiple UAVs 3) to launch two-way transmission frequency to each of the different satellites 11 in order to eliminate the frequency interference, or to transmit the beams to re-adjust the frequency of the satellites 11 until the satellites 11 resume their functions of self-recovering the communications. Afterward, the remote control center 2 and the different ground-based stations 4 should complete the task transfer, so that the communication network of the satellites 11 are back to normal operation.

Figure 4:
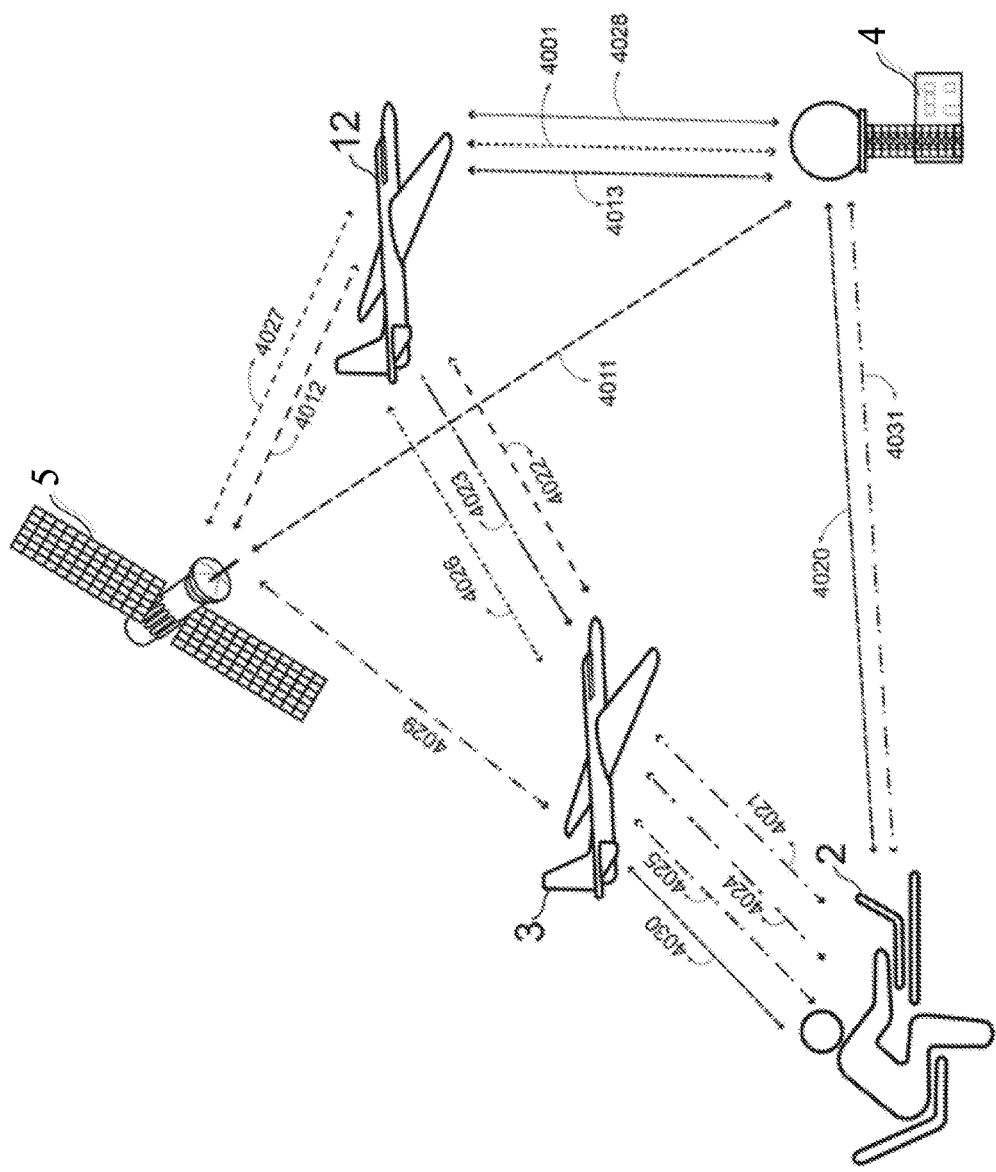
FIG. 4 is a schematic view of a system performing the method to troubleshoot communication transmission frequency signal attenuation of an UAV according to an embodiment of the present invention.

FIG. 4 is a schematic view of a system performing the method to troubleshoot communication transmission frequency signal attenuation of an UAV according to an embodiment of the present invention. As shown in FIG. 4, the aerospace vehicle in this embodiment is an UAV 12 (which is different from the UAV 3). In certain embodiments, the method as shown in FIG. 4 may be implemented by a system as shown in FIG. 1. It should be particularly noted that, unless otherwise stated in the present disclosure, the steps of the method may be arranged in a different sequential order, and are thus not limited to the sequential order as shown in FIG. 4 and described in the corresponding disclosure as below.

Referring to FIG. 4, under normal circumstances, taking the UAV 12 operated by the Beyond-Visual-Line-Of-Sight (BVLOS) or by the Extended Visual Line of Sight (EVLOS) as an example, the UAV 12 is controlled by a remote pilot on the ground to launch the two-way radio waves built in the UAV12 and the ground-based station 4 (step 4001). In certain embodiments, the UAV 12 may be operated by the remote pilot on the ground to transmit the positioning information of the UAV 12 to the specific satellite (or satellites) 5. Then, the satellite 5 will track the UAV 12 to start the two-way communication with the UAV 12 (step 4012). Afterward, the UAV 12 is able to initiate a two-way communication with the ground-based station 4 through the satellite 5 (step 4013). Consequently, the communication network among the UAV 12, the ground-based station 4 and the satellite 5 is created. In this case, as long as the communication network is fully functioning, there is no need to perform any recovery process to the UAV 12.

In terms of the frequency signal attenuation/fading caused to the UAV 12, in the future, the chances of frequency interference will become more and more. The frequency interference will affect the telecommunication quality to have clear and continuous communications between the ground-based station and the aircraft, the ground-based station 4 to satellites 5, the ground-based station 4 and UAVs 12, and between and among aerial vehicles and space vehicles. The worse scenario may affect normal telecommunications. When it happens, the ground-based station 4 will send a request to the remote control center 2 in order to perform a recovering process of the communication transmission function of the UAV 12 (step 4020). In certain embodiments, the method that the ground-based station 4 sends the request to the remote control center 2 may be implemented by transmitting an electromagnetic wave with the positioning information of the UAV 12, as well as other related information of the UAV 12.

Once the remote control center 2 receives the request from the ground-based station 4, the remote control center 2 will contact the UAV 3 (which functions as an electromagnetic wave transmission relay station) by transmitting an instruction to the UAV 3 (step 4021). In certain embodiments, the instruction is in the form of a signal of the same frequency of the positioning information of the UAV 12 such that the UAV 3 may use the positioning information to track the UAV 12. Once the UAV 3 receives the instruction from the remote control center 2, the UAV 3 will track and find the UAV 12 (step 4022). After the UAV 3 tracks and finds the UAV 12, the UAV 3 will receive the information related to frequency signal attenuation/fading occurred at the UAV 12 (step 4023). Then the UAV 3 will transmit such information to the remote control center 2 (step 4024). Afterward, the remote control center 2 should examine and analyze, based on the information transmitted by the UAV 3, the transmission barriers occurred at the UAV 12. Then, the remote control center 2 may organize ground staff, artificial intelligence devices or robots to operate and control the UAV 3. Specifically, the UAV 3 is equipped with one or more electromagnetic wave communication devices capable of frequency variation, and the remote control center 2 may control the UAV 3 to perform the functions of electromagnetic wave emission using the electromagnetic wave communication devices (step 4025). In this case, a two-way transmission may be carried out by the UAV 3 to transmit the frequency corresponding to the telecommunication frequency to perform a recovering process to the communication transmission function on the UAV 12, such as launching the frequency to eliminate the interference, or transmitting a beam to re-adjust the frequency of the UAV 12 (step 4026) in order to restore the telecommunication functions for the UAV 12. Once the recovery process is performed, the UAV 12 may retrieve two-way communication with the satellite 5 (step 4027), and the UAV 12 also will restart the two-way communications with the ground-based station 4 (step 4028). Alternatively, the satellite 5 may advise the UAV 3 of the restored communications of UAV 12 (step 4029), and the UAV 3 passes the same messages to the remote control center 2 (step 4030). Afterward, the remote control center 2 and the ground-based station 4 should complete the task transfer (step 4031), so that the UAV 12 communication network is back to normal operation.

In certain embodiments, it is possible that more than one UAV 12 suffers the frequency signal attenuation/fading at about the same time. In this case, different ground-based stations 4 are able to transmit the various positioning and interference information of each of the UAVs 12 to the remote control center 2 independently, and the remote control center 2 may perform the process to recover each UAV 12 separately. The remote control center 2 is able to distinguish the frequency signal attenuation/fading in different UAVs 12, and is capable of selecting and controlling one or more UAVs 3 as well as one or more electromagnetic wave communication devices capable of frequency variation to track different satellites 11 separately. After the UAV 3 (or multiple UAVs 3) tracks and finds the UAV 12, the remote control center 2 should be able to individually examine and analyze the telecommunication barriers for each UAV 12. Then, the remote control center 2 may control the UAV 3 (or multiple UAVs 3) to launch transmission frequency to different UAVs 12 in order to eliminate the frequency interference, or to transmit the beam to re-adjust the frequency of the UAVs until UAVs resume their function of self-recovering the communications. Afterward, the remote control center 2 and the different ground-based stations 4 should complete the task transfer, so that the communication network of satellites are back to normal operation.

In certain embodiments, the way the UAV 3 (or multiple UAVs 3) relates to the aerial and space vehicles come in different types, namely one-to-one, one-to-many, many-to-one, and many-to-many.

Figure 5:
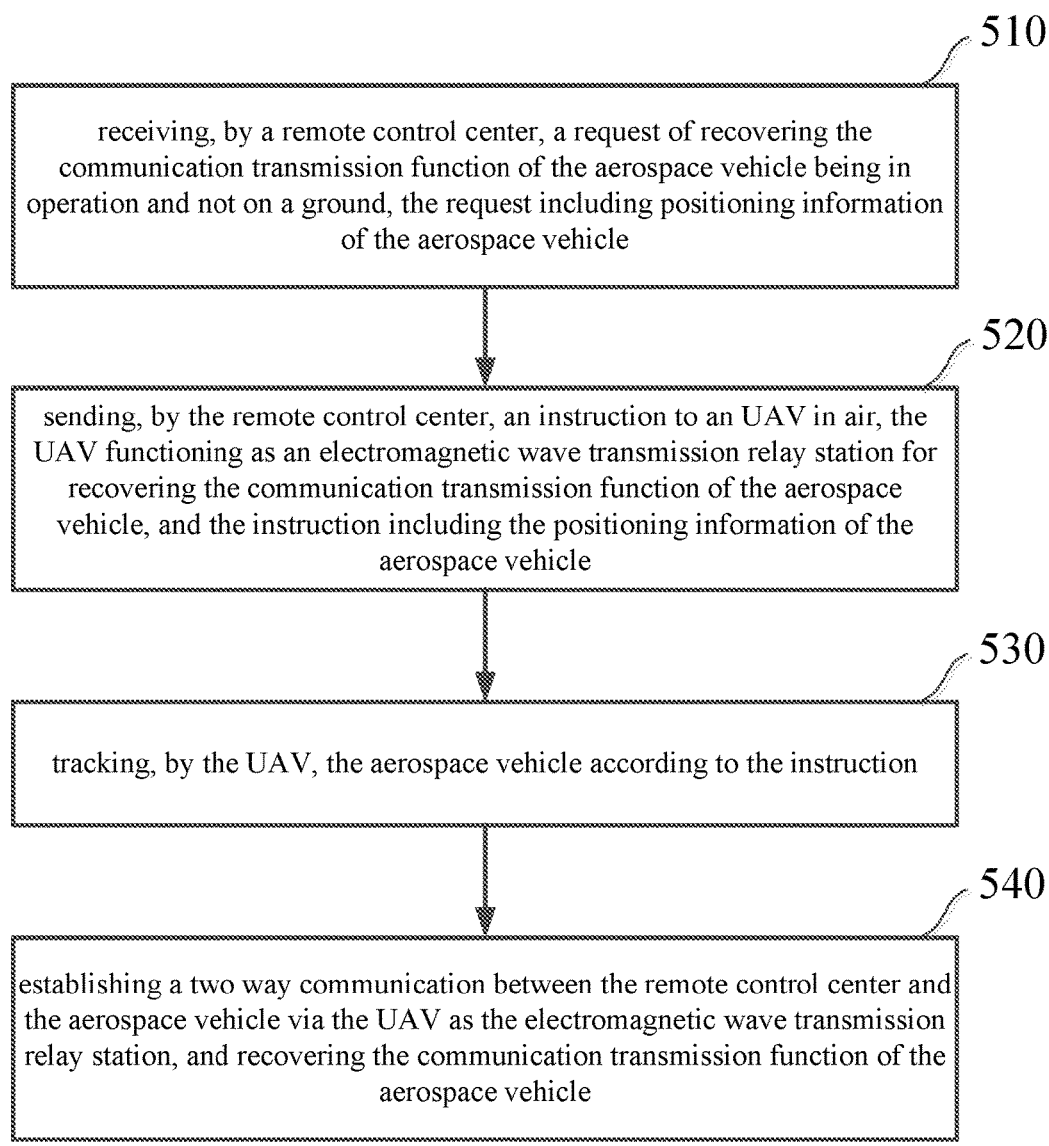
FIG. 5 is a flowchart showing the method according to certain embodiments of the present invention.

FIG. 5 is a flowchart showing the method according to certain embodiments of the present invention. In certain embodiments, the method as shown in FIG. 5 may be implemented by a system as shown in FIG. 1. It should be particularly noted that, unless otherwise stated in the present disclosure, the steps of the method may be arranged in a different sequential order, and are thus not limited to the sequential order as shown in FIG. 5 and described in the corresponding disclosure as below.

Referring to FIG. 5, at step 510, a remote control center receives a request of recovering the communication transmission function of the aerospace vehicle being in operation and not on a ground. In certain embodiments, the request includes positioning information of the aerospace vehicle. At step 520, the remote control center sends an instruction to an UAV in air. In certain embodiments, the UAV functions as an electromagnetic wave transmission relay station for recovering the communication transmission function of the aerospace vehicle, and the instruction includes the positioning information of the aerospace vehicle. At step 530, the UAV tracks and finds the aerospace vehicle according to the instruction. At step 540, a two-way communication is established between the remote control center and the aerospace vehicle via the UAV as the electromagnetic wave transmission relay station, and the communication transmission function of the aerospace vehicle may be recovered.

In certain embodiments, the method may include the steps of: (1) creating a remote control mechanism comprising staff (human beings), artificial intelligence devices or robots, which is organized depending on the frequency attenuation/fading and the differences in communication transmission within an aerospace vehicle, and controlling a UAV operating in the air; (2) creating the UAV operating in the air and functioning as an electromagnetic wave transmission relay station, wherein the UAV is equipped with an electromagnetic wave communication device capable of frequency variation; (3) creating a mechanism whereby the remote control, using the UAV, tracks an aerospace vehicle operating but having its message reception and transmission affected because of electromagnetic wave transmission frequency signal attenuation/fading; and (4) creating a mechanism whereby the UAV, controlled by the remote control center, functions as the electromagnetic wave transmission relay station and realizes a self-recovery communication transmission function by intensifying the electromagnetic waves or by initiating an electronic device installed in any aerial and space vehicle.

As discussed above, the aerospace vehicle 1 may be a flying manned aircraft 10, an outer space satellite 11 or a flying UAV 12.

In certain embodiments, the method as described above may be applied in a system which includes one or more aerospace vehicles 1. In certain embodiments, the system may include one or more UAVs 3 to function as the electromagnetic wave transmission relay station.

In certain embodiments, the aerospace vehicle 1 is in a situation where it undergoes electromagnetic wave transmission frequency signal attenuation and thus has its message reception and transmission affected.

In certain embodiments, the remote control center 2 may be ground-based, and may include staff (human beings), artificial intelligence devices or robots.

In certain embodiments, the UAV functions as an electromagnetic wave transmission relay station and tracks an aircraft operating but having its message reception and transmission affected because of transmission frequency signal attenuation. Furthermore, the UAV realizes a self-recovery communication transmission function by intensifying electromagnetic waves or by initiating an electronic device installed in any aircraft.

In certain embodiments, the aforesaid tracking process may be implemented by conventional tracking technique, such as a global positioning system (GPS) method disclosed in TW 100138374. However, it is not an essential technical feature of the present invention and thus is not described in detail herein for the sake of brevity.

In certain embodiments, the electromagnetic waves or computer programs transmitted by the remote control center are encrypted to prevent intrusion from unauthorized parties, such as hackers and terrorists, so as to ensure aviation safety. It is a conventional technique disclosed in the prior art; hence, it is not an essential technical feature of the present invention and thus is not described in detail herein for the sake of brevity.

In certain embodiments, the UAV 3 which functions as a communication relay station may be a UAV as disclosed in TW 103129610.

In certain embodiments, the UAV 3 further comes with a global navigation satellite system and an inertial navigation system and thus is capable of transmitting accurate positioning-related data and calculating positions of stationary and moving targets within a sensor's visual field. Meanwhile, the UAV 3 is equipped with an electromagnetic wave communication device capable of frequency variation which is able to emission adjust uplink and downlink connected to the aircraft 10, the satellite 11, and the UAV 12 which need to be repaired.

In certain embodiments, the remote control center is not restricted to human beings but includes artificial intelligence devices or robots.

In certain embodiments, the UAV is capable of receiving and transmission messages at different frequencies.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of recovering communication transmission function of an aerospace vehicle, comprising:
    receiving, by a remote control center, a request of recovering the communication transmission function of the aerospace vehicle being in operation and not on a ground, wherein the request comprising positioning information of the aerospace vehicle;
    sending, by the remote control center, an instruction to an unmanned aircraft vehicle (UAV), wherein the UAV is in air, and is configured to function as an electromagnetic wave transmission relay station for recovering the communication transmission function of the aerospace vehicle, and wherein the instruction comprises the positioning information of the aerospace vehicle;
    tracking, by the UAV, the aerospace vehicle according to the instruction; and
    establishing a two-way communication between the remote control center and the aerospace vehicle via the UAV as the electromagnetic wave transmission relay station, and recovering the communication transmission function of the aerospace vehicle,
    wherein the communication transmission function of the aerospace vehicle is recovered using the UAV as the electromagnetic wave transmission relay station by:
        receiving, by the UAV as the electromagnetic wave transmission relay station from the aerospace vehicle, information indicating frequency signal attenuation or fading occurred at the aerospace vehicle;
        sending, by the UAV as the electromagnetic wave transmission relay station, the information indicating frequency signal attenuation or fading occurred at the aerospace vehicle to the remote control center;
        examining and analyzing, at the remote control center, the frequency signal attenuation or fading occurred at the flying manned aircraft based on the information;
        sending, by the remote control center to the UAV, a signal for recovery of the communication transmission function of the aerospace vehicle; and
        sending, by the UAV, the signal to the aerospace vehicle to trigger a self-recovery process of the communication transmission function of the aerospace vehicle.

2. The method of claim 1, wherein the remote control center is located on the ground.

3. The method of claim 1, further comprising:
    receiving, by the remote control center, a task transfer signal from a ground-based station to complete a task transfer, wherein the task transfer signal indicates a regular communication with the aerospace vehicle.

4. The method of claim 1, wherein the aerospace vehicle is a flying manned aircraft.

5. The method of claim 4, wherein the signal is sent by the UAV to the flying manned aircraft for intensifying electromagnetic waves.

6. The method of claim 4, wherein the signal is sent by the UAV to the flying manned aircraft for restarting electronic equipment installed in the flying manned aircraft.

7. The method of claim 1, wherein the aerospace vehicle is a satellite.

8. The method of claim 7, wherein the signal is sent by the UAV to the satellite for intensifying electromagnetic waves.

9. The method of claim 7, wherein the signal is sent by the UAV to the satellite for restarting electronic equipment installed in the satellite.

10. The method of claim 7, wherein the signal is sent by the UAV to the satellite for launching a frequency to eliminate an interference in the satellite.

11. The method of claim 7, wherein the signal is sent by the UAV to the satellite for transmitting a beam to re-adjust a frequency of the satellite.

12. The method of claim 1, wherein the aerospace vehicle is a flying UAV different from the UAV as the electromagnetic wave transmission relay station.

13. The method of claim 12, wherein the signal is sent by the UAV to the flying UAV for launching a frequency to eliminate an interference in the flying UAV.

14. The method of claim 12, wherein the signal is sent by the UAV to the flying UAV for transmitting a beam to re-adjust a frequency of the flying UAV.

\* \* \* \* \*